United States Patent Office 3,131,083
Patented Apr. 28, 1964

3,131,083
METHOD OF IMPREGNATING CARD STOCK
Yung Chien Tang, Whitestone, N.Y., and Yao-Nan Sheng, Nutley, N.J., assignors to Standard Packaging Corporation, New York, N.Y., a corporation of Virginia
No Drawing. Filed Mar. 25, 1960, Ser. No. 17,488
6 Claims. (Cl. 117—63)

This invention relates to a method of impregnating paper products, and in particular of impregnating card stock with an epoxy resin.

The impregnation of paper with various types of resin is well known. United States Patent No. 2,422,423, for example, discloses a process of impregnating cardboard or paperboard with a urea-formaldehyde resin. It is also well known to impregnate paper with an epoxy resin prior to lamination thereof for use in pressure-molding of a laminate. In this instance, the paper is used to impart strength to a cured mass of epoxy resin.

Paper data storage and processing cards are conventionally impregnated with various plastic substances in order to improve the resistance of these materials to creasing and other damage which may occur during handling and to minimize dimensional changes which may occur during widely fluctuating temperature and humidity conditions. Coating or impregnating card stock with thermoplastic resins such as polyethylene and vinyl compounds, is a current practice, and the use of thermosetting resins such as urea-formaldehyde for this purpose is also known.

Each type of impregnated cards presently available, however, has certain disadvantages. The card stocks which have been impregnated with melamine, urea and phenolic resins, are much too brittle if sufficient resin is incorporated in the card stock to meet the dimensional stability requirements of high speed data processing equipment. Furthermore, these materials have poor color stability and tend to darken on exposure to light for extended periods of time. Cards coated with thermoplastic materials have relatively poor dimensional stability under changes in temperature and humidity. In addition, the stiffness or rigidity of the presently available cards tends to change markedly under varying conditions of temperature and humidity.

Other means of providing a trouble-free data processing card have been investigated. Pure vinyl sheets which have an embossed surface simulating paper have found limited use. These cards are heavy and are relatively expensive. Also, laminated products which consist of an interior layer of a polyester film laminated to two exterior sheets of paper have been employed. Laminated products are expensive and have an undesirable tendency to curl.

According to the method of this invention, card stock is impregnated by first immersing the stock in a solvent solution of partially polymerized epoxy resin containing an active catalyst. After the stock has been saturated with the impregnating solution, it is withdrawn and excess solution is removed from the surface thereof. The stock is then heated to remove solvent and to complete the curing of the resin.

The moisture content of the paper stock before impregnation generally is in the range of from about 5 to about 6%. After the curing step, the moisture content has been reduced to 1 to 2%. In order to obtain a product having the optimum characteristics, it is necessary that the final product contain from 4.0 to 7.0% moisture.

Increasing the moisture content of the impregnated and cured card stock presents many problems. Because of the impregnation, the paper is partially water-repellant. If the moisture is added back in an uneven manner, the card warps and is unsuitable for use in data processing machines.

As an additional embodiment of this invention, it has now been found that the moisture content of the impregnated and cured card stock can be restored to a value of 4.0 to 7.0% by simply passing the impregnated paper through water containing a small amount of a wetting agent. It is further important that the water bath be maintained within a certain critical temperature range as will be more fully described below.

The process of this invention provides a means of obtaining a high quality dimensionally stable data processing card which is able to withstand hard usage, which has good printability, and which is relatively chemically inert. Grease, water and the like can be wiped from the card without affecting its performance characteristics. The card is dimensionally stable and does not change dimensions under varying conditions of humidity and temperature. In addition, the card has a stiffness or rigidity which does not change with fluctuations in temperature and humidity. By following the process of this invention, it is also possible to obtain a card having an optimum moisture content, thus reducing its brittleness. In addition, the card is rigid and tough, and has excellent color stability.

The epoxy resins which may be employed according to this invention include those having an epoxy equivalent within the range of between about 140 and about 290. The epoxy resins are prepared by reacting epichlorohydrin and bisphenol A to provide a diglycidyl ether of bisphenol A. A viscosity range of from about 8000 to 20,000 cps. is preferred. Epoxy resins having a viscosity outside of this range may be employed, although they may be more difficult to handle.

Examples of commercial epoxy resins found to be useful according to this invention are Epon resins 820, 828 and 834, manufactured by the Shell Chemical Company; Araldite 6005 and Araldite 6010, manufactured by the Ciba Company; Epi-Rez 507 and Epi-Rez 510, manufactured by Jones-Dabney Company, Inc.; ERL resins, manufactured by the Bakelite Company; and a number of the epoxy resins manufactured by Dow Chemical Company.

The epoxy resin is generally employed at a level sufficient to provide a resin content in the paper of from about 2% to about 15% of the final product. At levels above this range, the resin will leave an undesirable shiny residue on the surface of the paper. At levels below about 2%, there is little improvement in the physical and chemical properties of the paper. The preferred level is 6 to 7%.

A catalyst or cross-linking agent is employed with the epoxy resin in order to cure it to an infusible form. The preferred cross-linking agent for Araldite 6010 is triethylenetetramine. Other curing agents which can be employed are various primary and secondary amines, including the primary aliphatic amines diethylene triamine and diethylamine propylamine and their adducts. Organic acids and acid anhydrides may also be used, but these two types are generally somewhat less effective.

The epoxy resins of this invention are applied to the paper from a solvent solution containing the resin and the cross-linking agent in stoichiometric proportions. The uncured epoxy resins and the cross-linking agents are soluble in oxygenated solvents such as ketones, esters and ethers and in highly halogenated hydrocarbons. The efficiency of the solvent declines with increasing polymerization. Aromatic solvents, such as toluene and xylene and simple alcohols such as isopropanol and n-butyl alcohol, may be used in combination with the oxygenated solvents, although they are not themselves active solvents for the epoxy resins. Use of these auxiliary solvents is preferred according to this invention because they develop latent solvency, giving optimum resin penetration of the paper and good flow characteristics of the impregnating solution. A balanced solvent containing one part of methyl isobutyl ketone, one part butyl alcohol and one part of xylol is preferred. Equally preferred is a solvent containing one part methyl isobutyl ketone, one part butyl alcohol and one part of Amsco E, a petroleum solvent containing 70% aromatics, including xylol, which is sold by American Mineral Spirits Co.

In addition, the solvent solution of epoxy resins may contain modifiers, plasticizers or flexibilizers to impart desired characteristics to the final impregnated card. Long chain polyhydric phenols or polyalcohols with polyfunctional halohydrins may be used to improve the flexibility of the product. The epoxy resins may also be blended with minor amounts of other resins such as vinyl resins. Partially hydrolyzed copolymers of vinyl chloride and vinyl acetate, having a vinyl chloride content of about 91% can be used, as well as acrylic resins, such as Rohm & Haas AT–50, and the like. Other useful plasticizers include phthalates; phosphates such as tricresyl phosphate; Santicizer 141, a phosphate type vinyl plasticizer sold by Monsanto Chemical Co.; epoxy plasticizers such as Paraplex G–62, a permanent polyester plasticizer sold by Rohm & Haas; Shell X–71, a low molecular weight epoxy resin, sold by Shell Chemical Co.; epoxidized vegetable oils; and polyamides such as the thermoplastic Versamids, sold by General Mills, Inc.

It is generally preferred that the plasticizers be employed at a level of about 10%, based on the weight of the solids in the coating bath. Levels up to 40% may be employed where desired.

The aging of the impregnating bath is an important feature of this invention. After the desired constituents including resin and catalyst are dissolved in a solvent, the solution should be subjected to a partial polymerization during which the solution is aged at a temperature and for a period of time sufficient to obtain a substantial degree of polymerization. The polymerization should not proceed so far as to give an infusible resin. This process gives a resin solution having uniform molecular rearrangement and the use of this solution results in a more uniform impregnation. In addition, this step of partial polymerization before impregnation has the effect of reducing the time required to affect a substantially complete cure in the subsequent heat curing step. This is evidenced by the amount of acetone extractables found in the cured product.

The optimum aging conditions provide for approximately 75% of the polymerization reaction between an epoxy resin and an amine catalyst during the aging period. These results are obtained by aging the solution for 24 hours at 60–65° F. By using a resin solution which has been aged under the preferred conditions, an impregnated card having substantially no acetone extractables is obtained after a subsequent curing step.

Following the impregnation step, the stock is subjected to a baking or curing step at an elevated temperature, the temperature and time being varied to provide a substantially complete cure of the epoxy resin in the paper. In general, temperatures of from 250°–350° F. for times ranging from 5 to 30 minutes will provide the desired results. At temperatures above this level and for times in excess of these values, the paper stock will tend to be weakened. The optimum curing conditions are 5 minutes of heating at 280° F.

Following the curing step, the impregnated stock has a moisture content of from about 1 to about 2%. As it is desirable that the stock have a final moisture content in the approximate range of 4.0 to 7.0%, a remoistening step is employed whereby the stock is passed through a water bath containing a wetting agent.

There are several critical features of the remoistening step which require careful attention. In the first place, a small amount of wetting agent must be employed in the remoistening bath. The wetting agents may be either anionic or non-ionic types. Examples of suitable anionic types include Aerosol OT, a sodium dioctyl sulfosuccinate; Aerosol MA, a bis(1-methylamyl) sodium sulfosuccinate; and Aerosol AY, a sodium diamyl sulfosuccinate; all manufactured by the American Cyanamid Company. Other suitable anionics include Triton X–200, a sodium salt of alkylated aryl polyether sulfonate, manufactured by Rohm & Haas; and Nopco 1152–M, a mixture of sulfonated mineral oil and soap, manufactured by The Nopco Chemical Co. Suitable non-ionic surface active agents include Tween 20, a polyoxyethylene sorbitan mono-laurate, manufactured by Atlas Powder Co.; Renex 688, a polyoxyethylene sorbitan nonyl phenol, manufactured by Atlas Powder Co.; and Triton X–100, the sodium salt of an alkylated aryl polyether alcohol, sold by Rohm & Haas.

The wetting agent may be employed at levels ranging from 0.05% to 5%, based on the weight of the bath. Preferably a level of about 0.2% is employed.

The temperature of the water bath is also a critical feature of this invention. Preferably, the temperature of the bath should substantially correspond to the temperature of the cured paper at the point just before it enters the water bath. In practice, the drier is placed adjacent to the water bath so that the temperature of the paper as it enters the bath is in the range of 105°–115° F. Under these conditions it is preferred that a bath temperature within this same range be employed.

Substantial variation between the bath temperature and the temperature of the stock as it enters the bath gives many undesirable effects, including uneven remoistening with resulting warping of the card stock. It is preferred that the bath temperature be within 15° F. of the temperature of the stock at its point of entry.

An immersion time in the remoistening bath of approximately five seconds has been found to provide the desired increase in moisture content of impregnated .007 inch standard sulfite card stock under optimum bath temperature conditions. Under these same conditions, a minimum exposure time of one second and a maximum exposure time of ten seconds are employed. At least one second is required to impart a significant amount of moisture to the stock. On the other hand, if the stock is allowed to remain in the water for excessive periods of time, undesirable puckering of the stock will be experienced.

It should also be noted that as the water bath temperature increases, an increase in the time of immersion is necessary. Lower bath temperatures result in more rapid hydration and therefore require a lesser time of immersion.

An additional important feature of this invention is the addition of a small amount of oil to the water bath, together with an emulsifier sufficient to insure complete dispersion of the oil in the bath. The oil is employed to form a thin film on the impregnated paper and thus prevent excessive resin dusting on the surface of the impregnated cards. This consideration is important where the card stock is to be used as data processing cards, which are in turn to be used in data processing machines employing electrical contacts. Resin dusting under these conditions causes undesirable short circuiting of the electrical contacts.

The oil which can be used according to this invention is preferably a mineral oil, such as clear paraffin oil. Vegetable oils which are unstable and deteriorate during storage should be avoided. Silicone oils may also be employed.

Where a non-dusting oil is employed, the emulsifying agent for the oil may also serve as the wetting agent required to insure uniform and rapid remoistening of the impregnated stock. Nopco 1152–M, manufactured by the Nopco Chemical Company, supplies both mineral oil, emulsifier and wetting agent functions. The material consists of approximately 80% saponified mineral oil and 20% of a sodium soap solution. Where this material is employed, it is unnecessary to employ an auxiliary wetting agent. Another equally suitable product is Solvac oil 1535, a mixture of saponified oil and soap, manufactured by the Socony Vacuum Company. Castor oil can also be employed, preferably with Nopco 1408, a wetting and emulsifying agent manufactured by Nopco Chemical Company.

A preferred procedure is to employ a small amount of clear paraffin oil and an emulsifying agent such as Nopco 1152–M. The Nopco 1152–M can be used at a level within the range of 0.05% to 5%. The paraffin oil can also be used at a level within the range of 0.05 to 5%. An optimum system contains 0.2% of the paraffin oil and 0.2% of the Nopco 1152–M. The percentages given above are by weight based on the water.

After immersing the stock in the water solution, the stock is again passed through a pair of squeeze rollers to remove excess water solution. This step insures an even distribution of the moisture and of the oil, when employed over the card stock.

Papers which may be treated according to this invention include ground wood paper, sulfate sheet and sulfite sheet. The papers may have a thickness ranging from .001 inch to .025 inch. This process may also be useful with paper thicknesses above .025 inch, providing the resin is applied mostly to the surfaces of the paper. Complete impregnation of stock above .025 inch thick provides a product which is too brittle for most purposes.

In addition to data processing cards, paper treated according to this invention may be used for laundry or dry cleaning tickets of the type designed to stay with the clothes during the cleaning operation. Also, the impregnated paper is useful as theatre tickets, telephone book covers, punch cards, time cards, credit cards, file separators, and other similar applications.

The following examples will illustrate the method of this invention.

The examples refer to a number of commercial compounds which for convenience will be described at this point. The Araldite resins are epoxy resins manufactured by the Ciba Company. Araldite 6010 is a liquid epoxy resin having an epoxide equivalent of 195 and a viscosity at 25° C. of 16,000. The Araldite 6005 is a liquid having an epoxide equivalent of 190 and a viscosity at 125° C. of 8000.

The Versamids are thermoplastic polymers having molecular weights ranging from 3000 to 10,000 and softening points from 43° to 190° C. They are prepared by the condensation of polymerized unstaurated fatty acids with aliphatic amines. These materials are sold by the Chemical Division of General Mills, Inc.

ERL–2795 is a liquid epoxy resin sold by Bakelite Company. This material contains a diluent, has an epoxide equivalent of 179–194 and has a viscosity at 25° C. of 500–900.

Epon 828 is a liquid epoxy resin sold by the Shell Chemical Company, having an epoxide equivalent of 175–210 and a viscosity at 25° C. of 5000–15,000.

Amsco E is an aromatic solvent manufactured by American Mineral Spirits Company. It contains about 70% aromatics of which 85% is xylene.

The Nopco 1152–M is described above in the specification. Nopco 1408 is a sulfonated castor oil sold by the Nopco Chemical Company. The Solvac oil 1535 is also described above.

*Example 1*

An epoxy resin solution having the following composition was prepared.

| Ingredient: | Percent by weight |
|---|---|
| Araldite 6010 | 25 |
| Triethylenetetramine | 3 |
| Butyl alcohol | 20 |
| Methylisobutyl ketone | 24 |
| Amsco E | 28 |

The solution was mixed and stored at 65° F. for about 24 hours.

Standard sulfite card stock, 0.007 inch thick and weighing about 100 pounds per ream, was immersed in the aged epoxy resin solution for 5 seconds, and the excess liquid was removed by squeezing the stock through a pair of solvent-resistant rubber rollers.

The stock was then passed into a drying tower at 280° F. to remove the solvent and cure the resin. The stock was passed through the tower at a speed of 15 feet per minute, the conditions being equivalent to approximately 5 minutes of baking time. After the material was cured, it was submerged in a water solution containing 10 gallons of water, 75 grams of Nopco 1152–M, and 75 grams of mineral oil. The temperature of the stock immediately before it entered the water bath was 115° F. The temperature of the water bath was also maintained at 115° F.

The stock was immersed for 5 seconds, removed from the bath and passed through a pair of rubber rollers to remove excess water. The finished product was rewound and securely protected by polyethylene film or other moisture-proof paper. On analysis, it was found to contain 5.0% moisture and approximately 6% resin solids.

The stock was then cut into data processing cards and evaluated. The cards have excellent dimensional stability during wide fluctuations in temperature and humidity conditions. The cards have a tough, resilient finish, which is grease and dirt resistant, have good printability and are not brittle.

*Example 2*

An epoxy resin solution having the following composition was prepared.

| Ingredient: | Percent by weight |
|---|---|
| Araldite 6010 | 20 |
| Versamid 125 | 5 |
| Methylisobutyl ketone | 25 |
| Butyl alcohol | 25 |
| Amsco E | 25 |

The solution was mixed and stored at 65° F. for about 24 hours.

Standard sulfate card stock, 0.007 inch thick and weighing about 100 pounds per ream, was immersed in the aged epoxy resin solution for 5 seconds and the excess liquid was removed by squeezing the stock through a pair of solvent-resistant rubber rollers.

The stock was then passed into a drying tower at 280° F. to remove the solvent and cure the resin. The stock was passed through the tower at a speed sufficient to provide approximately 7 minutes of baking time. After the material was cured, it was submerged in a water solution containing 99.6% water, 0.2% Nopco 1152–M and 0.2% mineral oil. The temperature of the stock immediately before it entered the water bath was 115° F. The temperature of the water bath was also maintained at 115° F.

The stock was immersed for 5 seconds, removed from the bath and passed through a pair of rubber rollers to remove excess water. The finished product was rewound and securely protected by polyethylene film or other moisture-proof paper.

The stock was then cut into data processing cards which, on evaluation, were found to have excellent dimensional stability. The stiffness or rigidity of the cards did not change significantly during changes in temperature and humidity encountered under severe use conditions. In addition, these cards were more flexible than the cards made according to Example 1.

*Example 3*

The process of Example 2 was conducted using the following resin solutions in place of the solution used in Example 2.

(3A)

| Ingredient: | Percent by weight |
|---|---|
| Araldite 6005 (epoxy resin) | 12.5 |
| Versamid 115 (cross-linking agent) | 12.5 |
| Methylisobutyl ketone | 25.0 |
| Butyl alcohol | 25.0 |
| Amsco E | 25.0 |

(3B)

| | |
|---|---|
| ERL-2795 (epoxy resin) | 24 |
| Diethylenetriamine (cross-linking agent) | 3 |
| Methylisobutyl ketone | 25 |
| Butyl alcohol | 25 |
| Amsco E | 25 |

(3C)

| | |
|---|---|
| Epon 828 (epoxy resin) | 24 |
| Triethylenetetramine (cross-linking agent) | 3 |
| Methylisobutyl ketone | 25 |
| Xylene | 48 |

(3D)

| | |
|---|---|
| Araldite 6010 (epoxy resin) | 24.3 |
| Triethylenetetramine (cross-linking agent) | 2.9 |
| Santicizer 141, an alkyl aryl phosphate (Monsanto) | 2.7 |
| Butyl alcohol | 19.5 |
| Methylisobutyl ketone | 23.4 |
| Amsco E | 27.2 |

In each instance, data processing cards of excellent dimensional stability and having the other desirable characteristics of epoxy resin impregnated cards were obtained. The product obtained by using Formula 3A above was softer and more flexible than the cards obtained by either Example 1 or Example 2.

*Example 4*

The following additional water-solution formulations have been found to provide excellent results when used according to this invention in the process given in Example 2.

(4A)

| Ingredient: | Percent by weight |
|---|---|
| Nopco 1152-M | 0.5 |
| Water | 99.5 |

(4B)

| | |
|---|---|
| Nopco 1408 | 0.2 |
| Castor oil | 0.2 |
| Water | 99.6 |

(4C)

| | |
|---|---|
| Solvac oil 1535 | 0.3 |
| Mineral oil | 0.1 |
| Water | 99.6 |

(4D)

| | |
|---|---|
| Solvac oil 1535 | 0.5 |
| Water | 99.5 |

In addition, the following combinations of baking times and temperatures have been found to provide good results in the process of Example 2: baking for 30 minutes at 250° F.; for 2 hours at 200° F.; or for 5 minutes at 350° F. Each set of conditions provided cards of excellent quality.

*Example 5*

The dimensional stability of cards prepared according to this invention was tested by immersing the cards in room temperature water and measuring the resulting increase in length and width of the cards. The products of Examples 1 and 3D were compared with untreated cards after 5 seconds and 5 minutes of soaking time. The results are given in the following table.

| | Increase in length | Increase in width |
|---|---|---|
| Soaking for 5 seconds: | | |
| Example 1 cards | Negligible | Negligible. |
| Example 3D cards | do | Do. |
| Base paper (untreated) | 1/64 inch | 3/64 inch. |
| Soaking for 5 minutes: | | |
| Example 1 cards | Negligible | 1/64 inch. |
| Example 3D cards | do | 2/64 inch. |
| Base paper (untreated) | 1/64 inch | 5/64 inch. |

In addition, under use conditions of temperature and humidity, it was found that the untreated base paper cards had a 0.007 inch increase in width, while under the same conditions, cards made according to Example 1 had only a 0.001 inch increase in width.

We claim:

1. A method of impregnating card stock which comprises immersing the stock in an organic solvent solution of epoxy resin and catalyst, withdrawing the stock from the solution, heating the stock to remove solvent and to cure the resin, the moisture content of the stock after curing being less than 4%, and immersing the impregnated stock in an aqueous solution containing a wetting agent to adjust the moisture content of said stock to the approximate range of 4 to 7%, the temperature of the aqueous solution during the immersion step being substantially the same as the temperature of the cured stock at the time it entesr the aqueous solution.

2. Card stock prepared according to the method of claim 1.

3. A method of impregnating card stock which comprises immersing the stock in an organic solvent solution of partially polymerized epoxy resin containing an active catalyst, withdrawing the stock from the solution, heating the stock to remove solvent and to cure the resin, the moisture content of the stock after curing being less than 4%, immersing the impregnated cured stock in an aqueous solution containing small amounts of wetting agent and an emulsified oil to adjust the moisture content of said stock to the approximate range of 4 to 7% and to provide a thin film of oil on the stock, the temperature of the aqueous solution during the immersion step being substantially the same as the temperature of the stock at the time it enters the aqueous solution.

4. A method of manufacturing data processing cards which comprises immersing card stock in a solution of partially polymerized epoxy resin and an active catalyst in an organic solvent comprising butyl alcohol, methyl isobutyl ketone and xylene, withdrawing the stock from the solution, heating the stock to remove solvent and to cure the resin, and immersing the stock in an aqueous solution containing small amounts of a wetting agent and an emulsified oil, the temperature of the aqueous solution during the immersion step being substantially the same as the temperature of the stock at the time it enters the aqueous solution.

5. A data processing card prepared according to the method of claim 4.

6. A method of manufacturing data processing cards which comprises immersing card stock in a solution of partially polymerized epoxy resin and an active catalyst in an organic solvent, withdrawing the stock from the solution, passing the stock through a pair of solvent-resistant rollers to remove excess solution, heating the stock to remove solvent and to cure the resin, immersing the stock in an aqueous solution containing small amounts of a wetting agent and an emulsified oil, withdrawing the stock from the water solution and removing excess of the water solution from the surface of the stock, the temperature of the water solution during the immersion step being substantially the same as the temperature of the stock at the time it enters the water solution.

References Cited in the file of this patent

UNITED STATES PATENTS

| | | |
|---|---|---|
| 1,914,799 | Bidwell | June 20, 1933 |
| 2,134,659 | Ellis | Oct. 25, 1938 |
| 2,541,027 | Bradley | Feb. 13, 1951 |
| 2,662,032 | Uhlig | Dec. 8, 1953 |
| 2,752,269 | Condo et al. | June 26, 1956 |
| 2,913,356 | Schroeder | Nov. 17, 1959 |
| 3,015,577 | Sacher | Jan. 2, 1962 |